(12) United States Patent
Lincoln et al.

(10) Patent No.: US 7,090,246 B2
(45) Date of Patent: Aug. 15, 2006

(54) ANTI-SUBMARINING AIRBAG MODULE

(75) Inventors: Paul Lincoln, Nierstein (DE); Hans Lochmann, Niedernhausen (DE)

(73) Assignee: Key Safety Systems, Inc., Sterling Heights, MI (US)

( * ) Notice: Subject to any disclaimer, the term of this patent is extended or adjusted under 35 U.S.C. 154(b) by 225 days.

(21) Appl. No.: 10/736,475

(22) Filed: Dec. 15, 2003

(65) Prior Publication Data
US 2004/0163872 A1 Aug. 26, 2004

(30) Foreign Application Priority Data
Jan. 16, 2003 (DE) ............................. 103 01 462

(51) Int. Cl.
*B60R 21/18* (2006.01)
(52) U.S. Cl. ................ 280/733; 280/728.2; 280/730.1
(58) Field of Classification Search ............ 280/730.1, 280/730.2, 752, 753, 743.1, 733, 728.2
See application file for complete search history.

(56) References Cited

U.S. PATENT DOCUMENTS

| | | | | |
|---|---|---|---|---|
| 5,114,180 A | * | 5/1992 | Kami et al. .............. 280/743.1 |
| 5,466,003 A | * | 11/1995 | Tanaka et al. ............. 280/733 |
| 5,474,326 A | * | 12/1995 | Cho .......................... 280/733 |
| 5,601,332 A | * | 2/1997 | Schultz et al. ........ 297/216.13 |
| 5,695,242 A | * | 12/1997 | Brantman et al. ....... 297/216.1 |
| 5,797,620 A | | 8/1998 | Eyrainer |
| 5,902,010 A | * | 5/1999 | Cuevas .................. 297/216.13 |
| 5,904,370 A | * | 5/1999 | Steiner et al. ........... 280/743.1 |
| 6,017,059 A | * | 1/2000 | Taubenberger et al. ..... 280/752 |
| 6,029,993 A | | 2/2000 | Mueller |
| 6,126,194 A | * | 10/2000 | Yaniv et al. ................. 280/733 |
| 6,129,376 A | * | 10/2000 | H.ang.land ............... 280/730.1 |
| 6,138,067 A | * | 10/2000 | Cobb et al. ................... 701/45 |
| 6,158,766 A | * | 12/2000 | Kowalski ................. 280/730.1 |
| 6,217,059 B1 | * | 4/2001 | Brown et al. ............ 280/730.2 |
| 6,220,626 B1 | * | 4/2001 | Utsumi et al. .............. 280/733 |
| 6,336,653 B1 | * | 1/2002 | Yaniv et al. ............. 280/730.1 |
| 6,371,511 B1 | * | 4/2002 | Kitagawa ................. 280/730.1 |
| 6,382,666 B1 | * | 5/2002 | Devonport ................... 280/733 |
| 6,425,602 B1 | * | 7/2002 | Al-Amin et al. ......... 280/730.2 |
| 6,464,246 B1 | * | 10/2002 | Bayley .................... 280/728.1 |
| 6,631,923 B1 | * | 10/2003 | Eckert et al. ............ 280/743.1 |
| 6,688,642 B1 | * | 2/2004 | Sollars, Jr. ................. 280/733 |
| 6,715,788 B1 | * | 4/2004 | Saiguchi et al. ......... 280/730.1 |
| 6,896,325 B1 | * | 5/2005 | Takedomi et al. ........ 297/216.1 |
| 6,905,134 B1 | * | 6/2005 | Saiguchi et al. ......... 280/730.1 |
| 2001/0011810 A1 | | 8/2001 | Saiguchi et al. |
| 2002/0020996 A1 | * | 2/2002 | Eckert et al. ............. 280/743.1 |
| 2002/0105176 A1 | * | 8/2002 | Hammer et al. ............ 280/733 |

(Continued)

FOREIGN PATENT DOCUMENTS

DE 197 38 728 A1 3/1999

(Continued)

*Primary Examiner*—David R. Dunn
*Assistant Examiner*—Barry Gooden, Jr.
(74) *Attorney, Agent, or Firm*—Lonnie Drayer

(57) ABSTRACT

An airbag module is disposed in the vehicle seat as an anti-submarining airbag module that includes an inflator, or a connection therefor, a tubular airbag, the two free ends of which are folded over at least once transversely relative to the longitudinal direction of the airbag to form loops, and wherein inserted into the loops of the airbag is a clamping member, by means of which the two layers of the folded-over parts of the airbag are brought into contact, to seal the airbag at least partially in a gastight manner.

20 Claims, 5 Drawing Sheets

U.S. PATENT DOCUMENTS

| | | | |
|---|---|---|---|
| 2002/0125701 A1* | 9/2002 | Devonport | 280/733 |
| 2002/0153715 A1* | 10/2002 | Namiki | 280/733 |
| 2002/0190515 A1 | 12/2002 | Birk et al. | |
| 2003/0034640 A1* | 2/2003 | Sollars, Jr. | 280/733 |
| 2003/0151234 A1* | 8/2003 | Ruel | 280/730.1 |
| 2004/0100075 A1* | 5/2004 | Sakai et al. | 280/730.1 |
| 2004/0113399 A1* | 6/2004 | Yoshikawa et al. | 280/730.1 |
| 2005/0046156 A1* | 3/2005 | Yoshikawa et al. | 280/728.2 |
| 2005/0173899 A1* | 8/2005 | Korechika | 280/730.1 |
| 2006/0017266 A1* | 1/2006 | Yoshikawa et al. | 280/730.1 |

FOREIGN PATENT DOCUMENTS

| | | |
|---|---|---|
| DE | 100 65 464 A1 | 8/2001 |
| EP | 1 270 960 A2 | 6/2002 |
| GB | 2 323 336 A | 9/1998 |
| WO | WO 97/44215 | 11/1997 |
| WO | WO 00/50271 | 8/2000 |

* cited by examiner

US 7,090,246 B2

ANTI-SUBMARINING AIRBAG MODULE

FIELD OF THE INVENTION

The present invention relates to an airbag module, in particular disposed in a vehicle seat as an anti-submarining airbag module, an airbag for an airbag module as well as a method of fastening an airbag to a frame part.

DISCUSSION OF THE PRIOR ART

Tubular airbags are known from the prior art. For example, EP 0 936 109 B1 teaches a tubular airbag, which is integrated in the region of the A-pillar and B-pillar and the roof rail of a vehicle and hence covers the side window opening. To fasten this airbag, its free ends are pressed together, i.e. flattened, so as to form substantially top and bottom surfaces, which are joined to one another by stitched seams. Preferably one or more layers of a strengthening fabric tape are wound around the end of the reinforced tube to prevent fraying. Fastening fittings and/or crimps are attached to the ends of the tubular airbag and press the top and bottom surfaces of the airbag together at its ends to seal them in a gastight manner. By means of the fastening fittings the airbag is fastened to suitable frame parts.

Further possibilities of sealing the airbag in a gastight manner arise from gluing, welding or stitching together the ends of the tubular airbag.

Such tubular airbags, when fastened and/or sealed in such a manner, may however only be inflated under a specific pressure to prevent bursting of the seams. In particular, the attachment of such sealing and/or fastening the tubular airbag is very laborious.

SUMMARY OF THE INVENTION

There is provided in accordance with the present invention an airbag module, in particular an airbag module disposed in a vehicle seat as an anti-submarining airbag module. The airbag module comprises an inflator or a connection therefor, and a tubular airbag, the two free ends of which are flattened and folded over at least once closing each end transversely relative to the longitudinal extent of the airbag to form loops. Passing through each of the loops of the airbag is a clamping member, by means of which the two layers of the folded-over parts of the airbag are brought into contact with one another to seal the airbag at least partially in a gastight manner. In the present case, the tubular airbag is advantageously folded over at its free ends in such a way that the airbag in the region of the folded-over and/or bent-over parts in cross section forms substantially two superimposed layer. The inflator, provided it is disposed In the airbag, is advantageously not used for sealing but may be accommodated in any desired manner in the airbag. Should the inflator be disposed outside of the airbag, then a connection in the form of a flange is formed in the airbag module and/or in the airbag.

The two flattened free ends of the tubular airbag may also advantageously be folded over a plurality of times transversely relative to the longitudinal direction of the airbag to achieve an increased gastightness of the airbag. This allows the airbag to be inflated at an even higher pressure. By bringing the two layers of the folded-over parts of the airbag into contact by with the clamping member, the gas tightness of the tubular airbag is advantageously achieved in a constructionally very simple manner and reliable manner. In addition, the manufacturing and assembly costs are reduced.

Forming the loops with the airbag makes it easier to dispose the clamping member on the airbag.

Preferably the airbag module is designed without a housing. Since there is no need to provide an airbag housing, the airbag module is extremely inexpensive to manufacture and advantageously easy to assemble.

In the deployed state, the airbag advantageously presses against the clamping member so that the two layers of the airbag in the region of the folded-over parts are pressed to a greater extent against one another. In this case, the airbag in the deployed state is self-sealing. The internal pressure of the inflated region of the airbag presses against the clamping member, which then in turn presses the two layers of the airbag in the region of the flattened folded-over parts to a greater extent against one another, thereby advantageously increasing gas tightness. An operationally reliable and dependable airbag module is therefore provided.

The clamping member is connected by a means for fastening, preferably screws, rivets or bolts, to a frame part of a vehicle. The means for fastening advantageously fix the position of the airbag relative to the frame part. Furthermore, by virtue of the versatility of the means for fastening, an advantageously high variability of the arrangement relative to the frame part of a vehicle may be achieved.

The clamping member advantageously extends at the at least one side of the airbag beyond the airbag. In said case, the clamping member is pushed transversely to the longitudinal direction of the airbag through the loops thereof and therefore projects at the at least one longitudinal side of the airbag beyond the airbag. Consequently, the airbag module may advantageously be fastened more easily to a frame part of a vehicle, with the result that the assembly costs may be reduced.

It is further preferred that the clamping member be a rod. This advantageously allows a reduction of the production cost since commercially available rods sold by the meter of appropriate length may be used to serve as a clamping member.

The clamping member at the at least one end is advantageously designed in the shape of a hook for engagement with the frame part. This makes it possible to achieve simplified assembly of the airbag module, since the hook-shaped end of the clamping member is introduced at right angles to an opening in the frame part into said opening and then the clamping member is tilted in relation to the frame part towards said frame part so that the hook-shaped end of the clamping member is in engagement with the frame part. The end of the clamping member opposite to the hook-shaped end is then connected by a suitable means for fastening, for example a screw, to the frame part.

It is further preferred that the clamping member at the at least one end has a swivel device, which is connected to the frame part so as to be capable of swiveling and/or tilting relative to the frame part. Swiveling the clamping member advantageously allows the clamping member to be brought into a position, in which it is particularly easy to introduce the clamping member into the loops of the airbag. The clamping member plus airbag may then be swiveled in the direction of the frame part and braced therewith, so that the two layers of the airbag in the region of the folded-over parts are clamped in between the frame part and the clamping member and consequently pressed against one another. Thus, in an advantageous manner, an increased gas tightness of the tubular airbag is achieved and assembly is simplified.

In a further preferred embodiment the ends of the folded-over parts of the tubular airbag are connected by a suitable fixing means, for example stitching, gluing or welding, to the airbag. By said means, simplified installation of the airbag module and safe transportation of the tubular airbag may advantageously be guaranteed, since contamination of the interior of the tubular airbag by foreign bodies or substances is prevented.

Preferably, the inflator is disposed inside the airbag. This simplifies assembly of the airbag module because only an airbag/inflator unit has to be fitted. In this embodiment the inflator is fixed by gluing, welding, stitching or riveting inside the airbag, wherein the inflator during deployment need not necessarily remain in its position, provided that the inflator itself is thrust-neutral. That is to say, upon activation the inflator discharges gas in each case in two mutually opposite directions, so that the inflator's position does not vary as a result of the gas discharge.

In a further advantageous embodiment the inflator is disposed outside of the airbag and is connected in a gastight manner by a conduit, preferably a tube or pipe, to the airbag interior. In said case, the tube is connected in a gastight manner to a corresponding connection on the airbag. This allows the inflator to be disposed in a position remote from the airbag, thereby advantageously allowing the installation space of the airbag to be minimized.

According to the invention an airbag for an airbag module is provided, wherein the airbag is formed from a portion of a seamless continuous tube and/or tube of meter goods, the free ends of which, to form loops, are flattened and folded over at least once closing each free end transversely relative to its longitudinal direction and fixed and/or stitched and/or stapled to a part of the airbag. It is advantageously possible in said case to use a cut-to-length piece of commercially available tubular meter goods as a (continuous) tube. Thus, for example, a piece of a fire hose in general use would also fulfil this purpose. By virtue of the use of a commercially available tube of meter goods it is therefore advantageously possible to reduce the cost of producing the airbag and, because there is no seam, provide an operationally reliable airbag, since there is no danger of a seam bursting. By forming loops at the free ends of the airbag a simplified assembly of the airbag is guaranteed because suitable clamping members may be introduced into said loops.

In a preferred embodiment the airbag in the inflated state substantially retains its initial circumference and its initial length. By virtue of the initial circumference and initial length of the tube remaining constant, the spatial requirement and/or bulkiness of the inflated airbag may advantageously be predetermined, with the result that an exact configuration of the vehicle body surrounding the airbag may be effected.

According to the invention the method of fastening an airbag to a frame part comprises the following steps: provision of a tubular airbag and a clamping member flattening and folding-over of the free ends of the airbag at least once closing each free end transversely relative to the longitudinal direction to form flattened loops in the end regions of the airbag; arrangement of the airbag in the region of the folded-over parts so that said parts in cross section form substantially two superimposed layers; introduction of the clamping member into the loops of the airbag and bringing the two layers of the airbag in the region of the folded-over parts into contact by means of the clamping member. By flattening and folding over the free ends of the airbag to form loops, the clamping members are advantageously easily inserted into said loops to bring the two layers of the airbag in the region of the folded-over parts into contact, so that they are advantageously sealed in a gastight manner.

In a preferred embodiment the method further comprises the following steps: connecting of the ends of the folded-over parts by a suitable fixing means, such as for example stitching, gluing or welding, to the airbag and connecting of the clamping member by means for fastening, preferably screws, rivets or bolts, to a frame part of a vehicle. By connecting the ends of the folded-over parts to the airbag, assembly of the clamping members may advantageously be simplified. Furthermore, by connecting the clamping member by means for fastening to a frame part, the position of the airbag module is advantageously reliably fixed.

According to the invention the airbag module according to the invention is used as a seat airbag, wherein the airbag is disposed in the seat region and/or backrest region of a vehicle seat. In said case, in the event of an accident, the airbag is inflated like an airbag inside the seat to prevent the passengers from being able to dive through under the lap belt, which is generally known as the "submarining effect". As a result, rates of injury to the lower extremities and contact with the front airbag may advantageously be improved. The lateral arrangement of this airbag module advantageously guarantees reliable lateral stabilization of the vehicle passengers, thereby in the event of lateral impact preventing the vehicle passengers from being displaced or moving into an undesirable position relative to the front airbag.

According to the invention the airbag module according to the invention is used as a knee airbag, wherein the airbag is disposed in the knee region and/or in the foot region behind the interior trim of a vehicle. The airbag is accommodated in a knee-high region behind the instrument panel trim. Thus, major knee injuries as a result of an accident are advantageously avoided because, in the event of an accident, the knee will collide with the airbag and contact with the hard instrument panel trim is avoided.

According to the invention an airbag module according to the invention is used as a foot airbag, wherein the airbag is disposed in the floor region under the floor mat and/or floor lining of a vehicle. Thus, the feet of the passengers may advantageously be protected from the pedals, thereby achieving an improved protective effect for the entire shin and foot region.

DETAILED DESCRIPTION OF THE INVENTION

Figure 1:
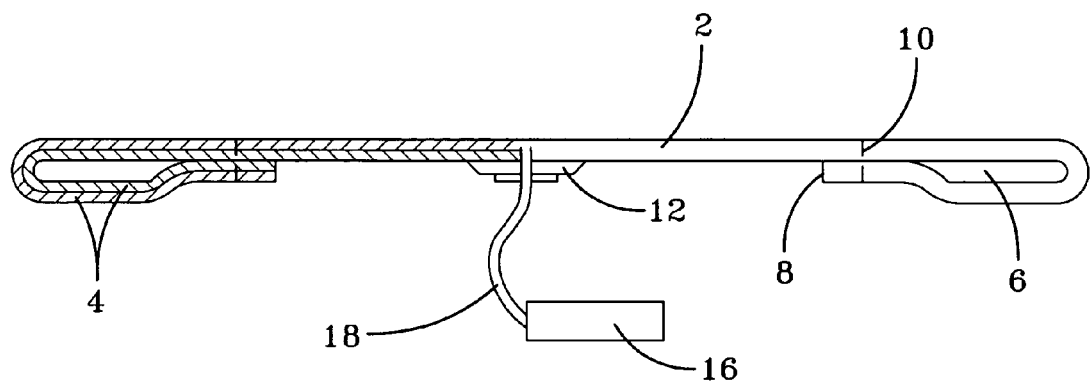
FIG. 1 is a front view, partially in section of an airbag module according to a first embodiment.
Figure 2:
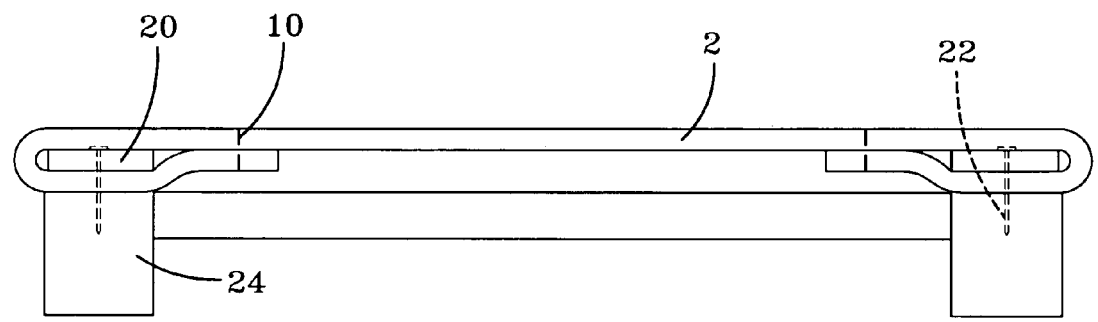
FIG. 2 is a front view of the assembled airbag module according to FIG. 1.
Figure 3A:
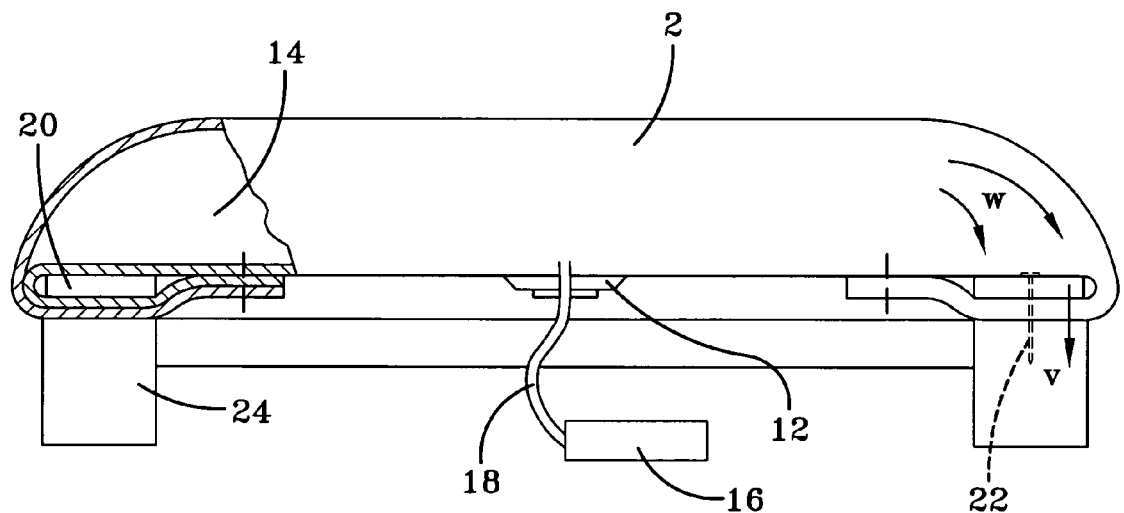
FIG. 3a shows the assembled airbag module according to FIG. 1 in a deployed state.
Figure 3B:
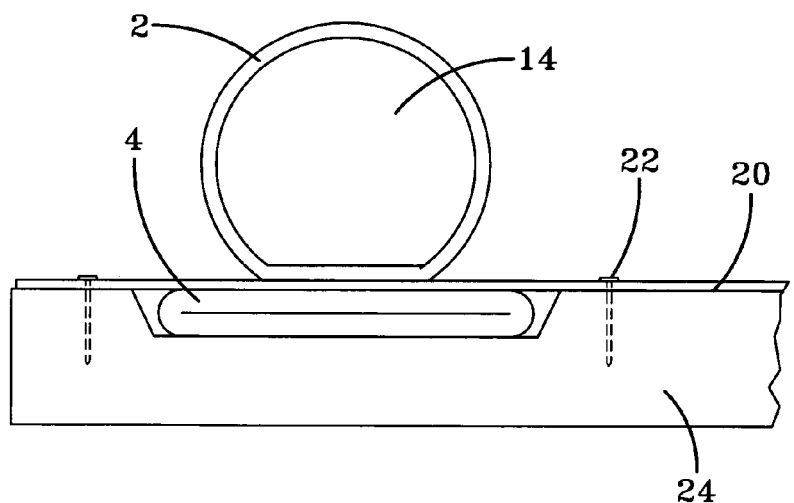
FIG. 3b is a cross section of the assembled airbag module according to FIG. 1 in a deployed state.
Figure 4:
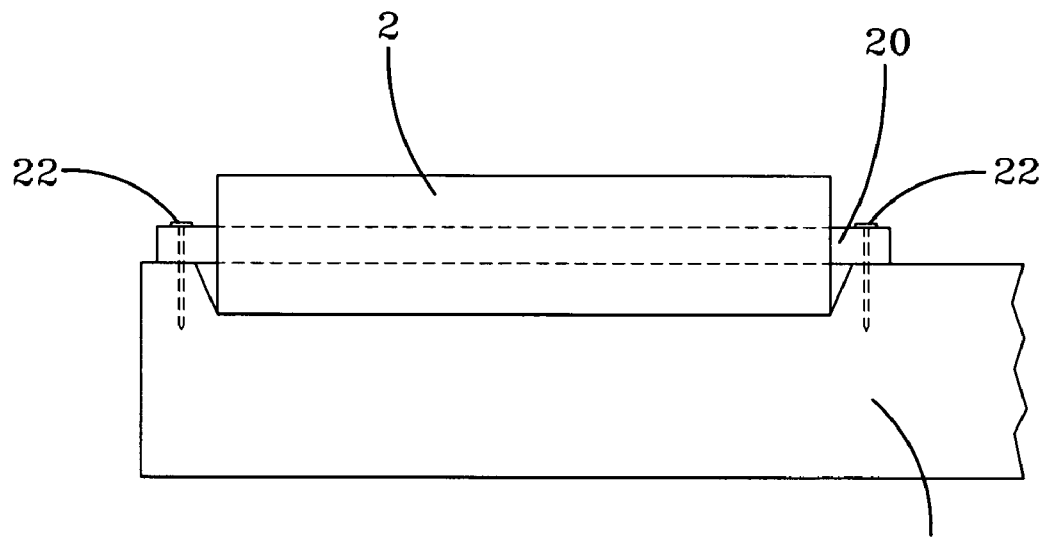
FIG. 4 is a side view of the assembled airbag module according to the first embodiment.

FIGS. 1 to 4 show a first embodiment of an airbag module according to the invention. The airbag module comprises an airbag 2, which substantially has the form of a portion of a continuous tube, which in the inflated state has a substantially tubular cross section. The tubular walls of the airbag 2 at least at its two open ends, i.e. its end faces, are flattened and pressed together so as to produce a type of band-shaped closed end portion, i.e. two superimposed flattened and pressed together layers 4. The two free closed ends 8 of the airbag 2 are folded over at least once towards the middle of the airbag so as to produce in both end regions of the airbag a loop 6, which extends transversely relative to the longitudinal direction of the airbag 2. By a suitable fixing means 10, preferably a seam, the free ends 8 of the airbag 2 are connected to a main portion of the airbag.

For inflating the airbag there is assembled with the airbag 2 an inflation fitting 12, which is connected in a gastight manner to the airbag 2 and communicates with the interior 14 of the airbag. An inflator 16 is connected to the inflation fitting 12 by a tube and/or pipe 18. In a preferred embodiment, however, the inflator 16 may alternatively be disposed in the interior 14 of the airbag 2.

Clamping members 20, preferably in the form of straps, are introduced and/or inserted transversely relative to the longitudinal direction of the airbag 2 through the loops 6 of the airbag 2. The clamping members 20 are secured by a means for fastening 22 to a frame part 24, for example a seat frame of a vehicle. In the present embodiment screws, bolts, rivets or the like may be used as a means for fastening. Consequently, each clamping member 20 presses the two layers 4 of the folded-over parts of the airbag 2 against a frame part 24. The airbag 2 is thereby sealed in a gastight manner relative to the environment.

In the inflated state, the internal pressure of the airbag interior 14 exerts a force upon the clamping members 20 and the means for fastening 22 in the direction indicated by the arrows W in FIG.—3a. Consequently, the clamping members and the means for fastening 22 are in turn pressed to a greater extent against the frame part 24 in the direction indicated by the arrow V in FIG.—3a, with the result that the two layers 4 of the folded-over parts are pressed to a greater extent against one another, thereby additionally increasing the gas tightness of the airbag 2.

Figure 5:
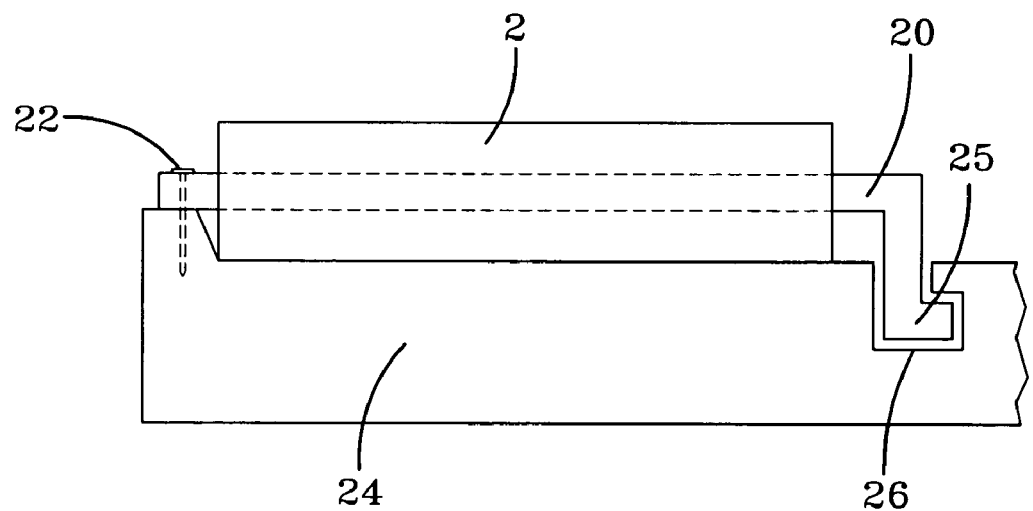
FIG. 5 is a side view of an assembled airbag module according to a second embodiment.

FIG. 5 shows a second embodiment of the present invention. Here, the clamping member 20 has a substantially rod-shaped design and projects beyond both sides of the airbag 2. One end of the clamping member 20 has a hook-shaped design. The hook-shaped end 25 of the clamping member 20 may be introduced into a corresponding recess 26 in the frame part 24, thereby preventing a variation of the position of the clamping member 20 in relation to the frame part 24. On the opposite end of the clamping member 20 to the hook-shaped end 25, a suitable means for fastening 22 as described above may be provided for connecting the end remote from the hook-shaped end 25 to the frame part 24.

Figure 6A:
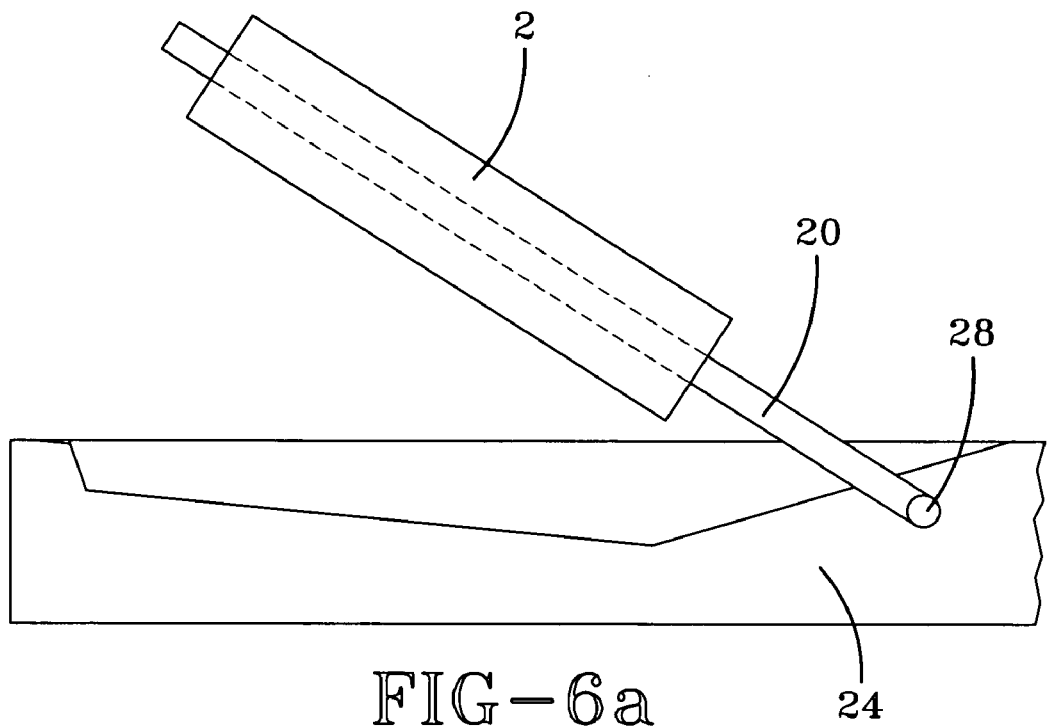
FIGS. 6a and 6b are side views of an airbag module according to a third embodiment.
Figure 6B:
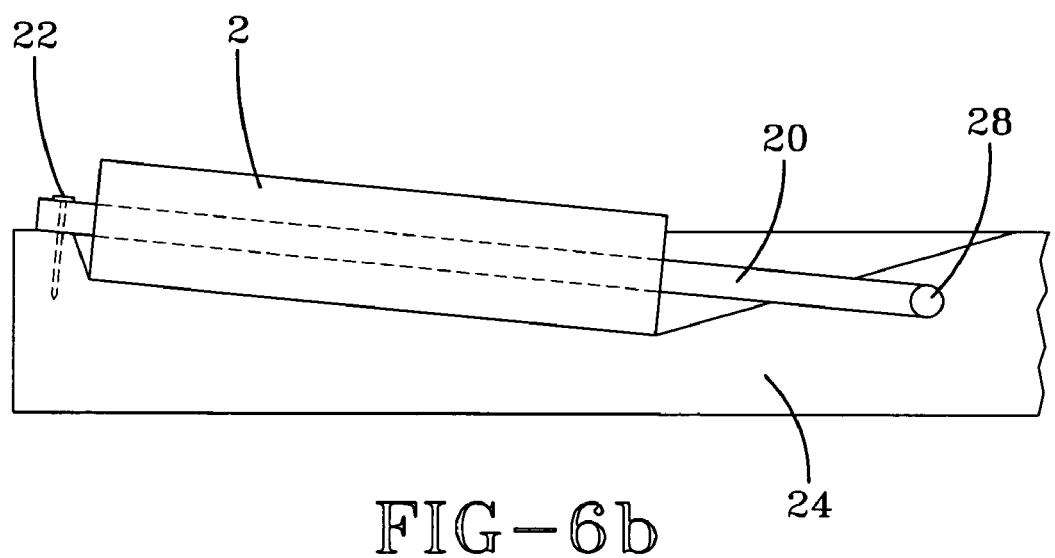

FIGS. 6a and 6b show a third embodiment of the present invention. Here, the clamping member 20 projects at both sides beyond the airbag 2. On its one end the clamping member 20 is provided with a swivel device 28. The swivel device 28 may, for example, take the form of a hinge or a suitable ball joint. On the end of the clamping member 20 opposite to the swivel device 28, as in the second embodiment, a means for fastening 22 is provided, by means of which said end of the clamping member 20 is connected to the frame part 24.

There now follows a description of the method of fastening the airbag 2 to the frame part 24. By flattening and folding over the free ends 8 of the airbag 2, a loop 6 is formed in each of the two closed end regions of the airbag 2. Clamping members 20, in the form of a rod, are inserted into the loops 6. To simplify insertion of the clamping members 20, the loops 6 are held in shape by connecting the flattened free ends 8 of the folded-over parts of the airbag 2 by suitable fixing means 10, for example stitching or welding, to the airbag 2. Once the clamping members 20 have been introduced into the loops 6, the two layers 4 of the folded-over parts of the airbag 2 are brought into contact, i.e. pressed against one another, by connecting the clamping members 20 to the frame part 24 by means for fastening 22, for example screws. Thus, the airbag 2 is sealed in a gastight manner relative to the environment.

Figure 7:
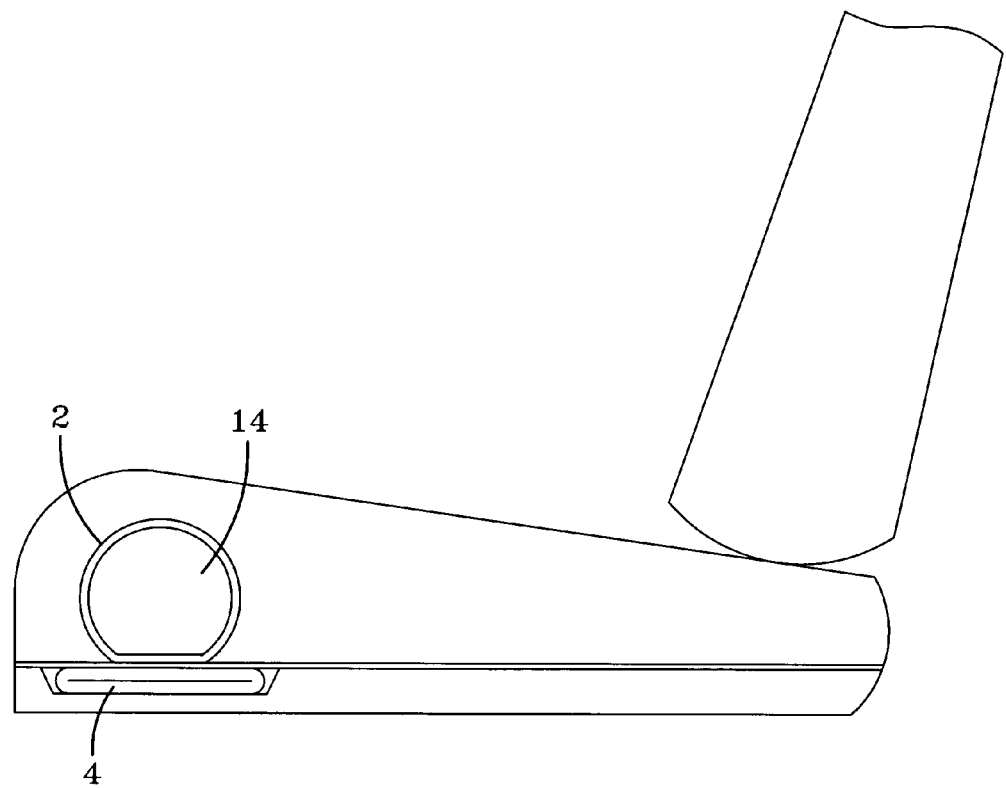
FIG. 7 is a side view of a vehicle seat with an airbag deployed according to the invention.

FIG. 7 is a side view of a vehicle seat having an airbag 2 according to the invention deployed therein such that the interior 14 of the airbag contains inflation gas to raise the front portion of the seat cushion. The layers 4 of the airbag that are secured to the seat are also shown.

While the invention has been explained with the specific embodiments of the invention, the explanation is illustrative and the invention is limited only by the appended claims.

We claim:

1. An airbag module, disposed in a vehicle as an anti-submarining airbag module, comprising an inflator or a connection therefor, a tubular airbag, the two free ends of which are flattened and folded over at least once closing each end transversely relative to the longitudinal direction of the airbag to form flat loops, and wherein there is inserted into the loops of the airbag a clamping member, by means of which the two layers of the folded-over parts of the airbag are brought into contact to seal the airbag at least partially in a gastight manner.

2. The airbag module according to claim 1, wherein the airbag module is designed without a housing.

3. The airbag module according to claim 2 wherein the airbag in an inflated state presses against the clamping member so that the two layers of the airbag in the region of the flattened and folded-over parts are pressed to a greater extent against one another.

4. The airbag module according to claim 2 wherein the clamping member is connected by a means for fastening to a frame part of a vehicle.

5. The airbag module according to claim 2 wherein the clamping member at the at least one side of the airbag extends beyond the airbag.

6. The airbag module according to claim 2 wherein the clamping member has a rod shape.

7. The airbag module according to claim 1, wherein the airbag in an inflated state presses against the clamping member so that the two layers of the airbag in the region of the flattened and folded-over parts are pressed to a greater extent against one another.

8. The airbag module according to claim 1, wherein the clamping member is connected by a means for fastening to a frame part of a vehicle.

9. The airbag module according to claim 1, wherein the clamping member at the end of at least one side of the airbag extends beyond the airbag.

10. The airbag module according to claim 1, wherein the clamping member has a rod shape.

11. The airbag module according to claim 10, wherein at least one end of the clamping member is designed in the shape of a hook for engagement with the frame part.

12. The airbag module according to claim 10, wherein at least one end of the clamping member has a swivel device, which is connected to the frame part so as to be capable of swiveling and/or tilting relative thereto.

13. The airbag module according to claim 1, wherein the ends of the flattened and folded-over parts are connected by a suitable fixing means to the airbag.

14. The airbag module according to claim 1, wherein the inflator is disposed inside the airbag.

15. The airbag module according to claim 1, wherein the inflator is disposed outside of the airbag and connected by a conduit to the airbag interior in a gastight manner.

16. The airbag module according to claim 1, disposed in at least one of a seat region or a back rest region of a vehicle seat.

17. The airbag module according to claim 1 disposed in at least one of a knee region or a foot region of the vehicle behind an interior trim member of the vehicle.

18. The airbag module according to claim 1 disposed in at least one of a floor region of a vehicle below a floor mat or a floor lining of the vehicle.

19. An airbag for an airbag module, wherein the airbag is formed from a portion of a seamless continuous tube of cut to length seamless tubular goods, the free ends of which, to form loops, are flattened and folded over at least once transversely relative to its longitudinal direction and fixed to a part of the airbag.

20. The airbag for an airbag module according to claim 19, which in the inflated state substantially retains its initial circumference and its initial length.

* * * * *